United States Patent

Block et al.

[11] B 3,916,797
[45] Nov. 4, 1975

[54] POWER DRIVEN CONVEYOR
[75] Inventors: Bruce E. Block; Philip H. Samuelson, both of Rockford, Ill.
[73] Assignee: Rockford Automation, Inc., Rockford, Ill.
[22] Filed: Mar. 11, 1974
[21] Appl. No.: 449,647
[44] Published under the Trial Voluntary Protest Program on January 28, 1975 as document no. B 449,647.

[52] U.S. Cl. ............ 104/172 B; 104/109; 104/135; 198/183
[51] Int. Cl.² .......................................... B61B 13/08
[58] Field of Search .......... 104/135, 106, 107, 108, 104/109, 172 R, 172 B, 172 C; 198/177 R, 183

[56] References Cited
UNITED STATES PATENTS

| | | | |
|---|---|---|---|
| 1,852,942 | 4/1932 | Streine | 198/183 |
| 3,237,755 | 3/1966 | Weihe | 198/183 |
| 3,511,187 | 5/1970 | Hanna | 104/172 B |
| 3,631,967 | 1/1972 | Converse et al. | 198/183 |

*Primary Examiner*—Lloyd L. King
*Assistant Examiner*—Randolph A. Reese

[57] ABSTRACT

Spaced, parallel trackways extend in a closed, horizontal loop. Each trackway is formed from two identical extrusions welded together to provide a generally C-shaped cross-section. An endless conveyor chain rides in each trackway opening, and carries roller wheels outside the trackway. Pallets ride on the roller wheels to be driven thereby, or merely supported on the moving roller wheels when the pallets are stopped. Inside each trackway are pairs of wheels mounted on an upright axle and bearing against opposite sides of the trackway to support the pallet load. A common drive train powers each conveyor chain whose linear speed is equal, but whose speed around the arcuate ends is different relative to the pallets.

10 Claims, 3 Drawing Figures

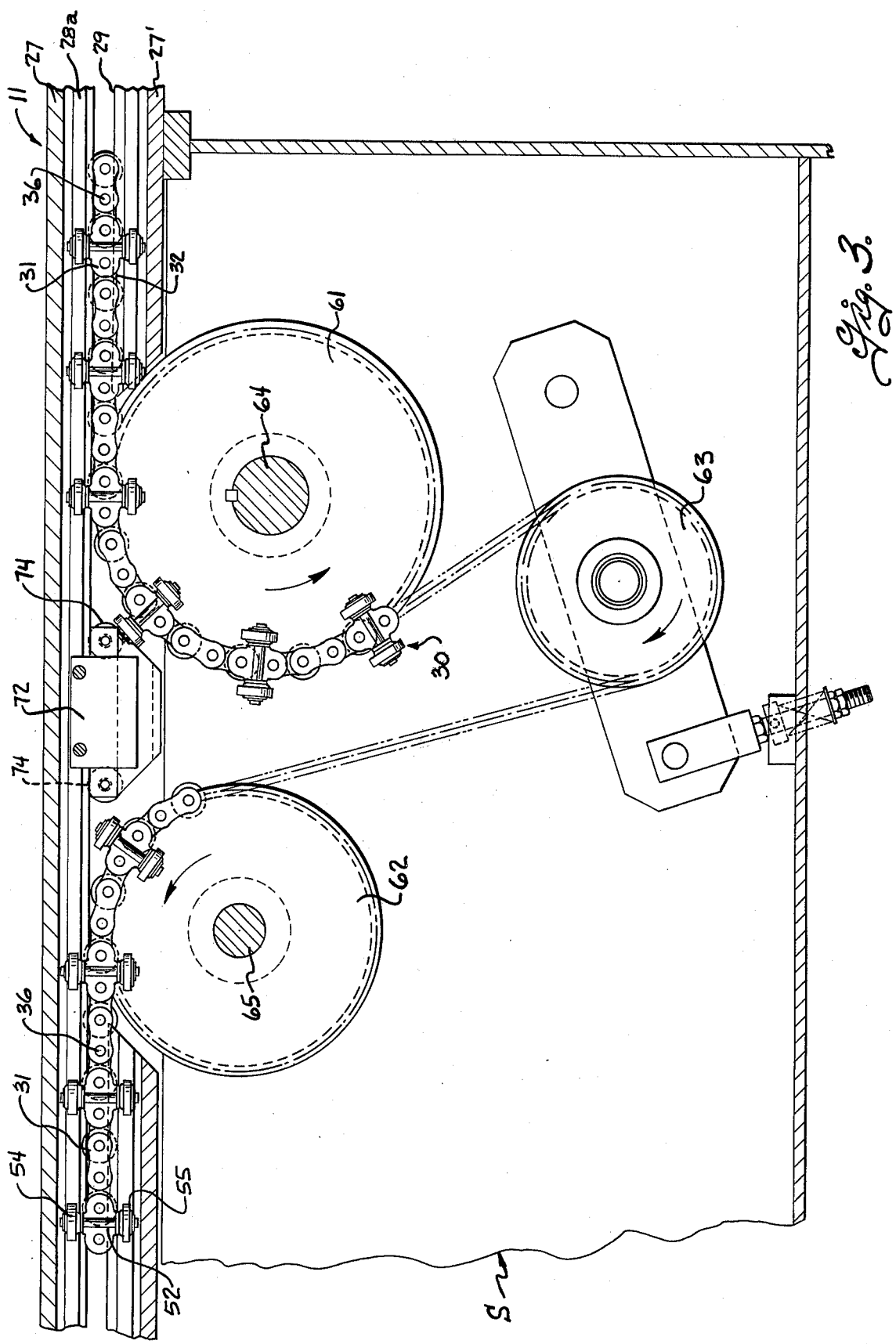

POWER DRIVEN CONVEYOR

BACKGROUND

The invention pertains to conveyors and, more particularly, to power driven conveyors.

Roller chains are well known and have been incorporated in conveyor systems. Some conveyor systems have article-support rollers extending between spaced chains. These rollers allow the articles to be stopped without stopping the conveyor and, when the article is releaved, the friction gradually accelerates the article to conveyor speed. A similar result is obtained by roller wheels carried by spaced chains. Such wheels, however, apply an overturning force on the conveyor chain. It is desirable to provide a conveyor having spaced trackways which both support the roller chain and resist the overturning forces. It is also desirable that the trackways serve as lateral guides for the article supported on the roller wheels, provide a guard to inhibit foreign matter from falling on the chain, and/or be readily and economically manufactured and assembled.

Summary

The present invention relates to a power driven conveyor having spaced, parallel trackways extending in a closed loop so that the conveyor is an endless conveyor.

It is an object of the present invention to provide a power driven conveyor having spaced trackways which support the roller chain and resist any overturning forces on the chain.

Another object is to provide a power driven conveyor having spaced trackways and which has one or more of the following functions or advantages:

a. laterally guides articles being driven;

b. guards the chain from foreign matter;

c. has internal wheels which resist the overturning force on the chain; and d. is readily manufactured and assembled.

Yet another object of the invention is to provide a power driven conveyor having spaced trackways which are formed from two identical extrusions with a resulting generally C-shaped cross-section.

It is another object to provide a conveyor in accordance with the foregoing object and having arcuate end sections in which the trackways are stretch-bent into concentric arcs.

These, and other objects and advantages of the present invention, will become apparent as the same becomes better understood from the following detailed description when taken in conjunction with the accompanying drawings.

DRAWINGS

FIG. 3 is a longitudinal sectional view taken generally along line 3—3 of FIG. 1 and on a scale intermediate that of the other two figures.

DESCRIPTION

Figure 1:
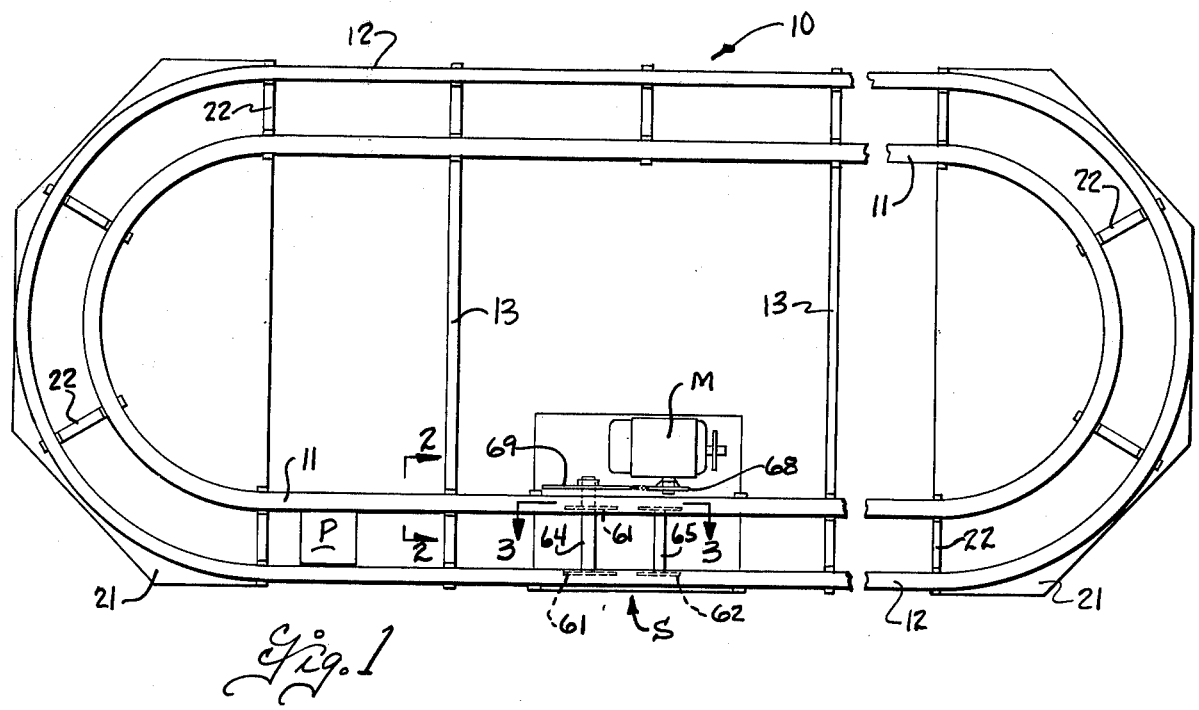
FIG. 1 is a plan view of an embodiment of the present invention.

Reference is now made more particularly to the drawings which illustrate the best presently known mode of carrying out the invention and wherein similar reference characters indicate the same parts throughout the several views.

The illustrated embodiment of a power driven conveyor, generally designated 10, includes spaced trackways 11 and 12 which extend in a closed horizontal loop so that the conveyor is an endless conveyor. The longitudinally extending portions of the trackways 11 and 12 are parallel to each other; while they are concentric at the arcuate end portions. The trackways 11 and 12 are supported on a plurality of trestles 13 which extend between both longitudinal runs of the trackway. Each trestle 13 includes upright tubular legs 14 directly under the trackways and a cap 15 on which the trackways may be mounted by means of clamps 16 (see FIG. 2). The trackways 11 and 12 are advantageously stretch-bent into the concentric end portions. In the embodiment illustrated, each end portion includes a base plate 21 which extends through the common arc center, and a plurality of H-shaped supports 22 rigidly fixed to the base plate 21 and on which the concentric trackways are clamped into position. A pallet P is disposed between the trackways 11 and 12 and is provided with an arcuate outer edge so that it can travel around the arcuate end sections of the conveyor. A drive station S includes a motor M which provides the motive force for the conveyor. The manner in which the motor M drives the conveyor will be described in greater detail below.

Each trackway includes identical, elongate upper and lower extruded members 24 and 24' which are welded together as at 25 to provide a generally C-shaped cross-section. As can be seen, the members include upright rear walls 26, 26' and transverse walls 27, 27'. The bottom wall 27' provides flanges by which the clamp 16 can mount the trackways. Front walls 28, 28' extend toward each other but are spaced apart to provide a laterally opening access to the interior passageway defined by the walls. It is deemed apparent that the access opening will face the access opening of the opposite trackway and will extend the full length of the trackway. Upper member 24 has an upright face 28a on the wall 28 above the access opening. Lower member 24' has an upright face 26a' on wall 26' opposite the access opening and at a level therebelow. Faces 26a' and 28a define part of the internal passageway. Wall 28' has an upwardly facing bearing surface 29 which, of course, is at the bottom of the access opening.

Figure 2:
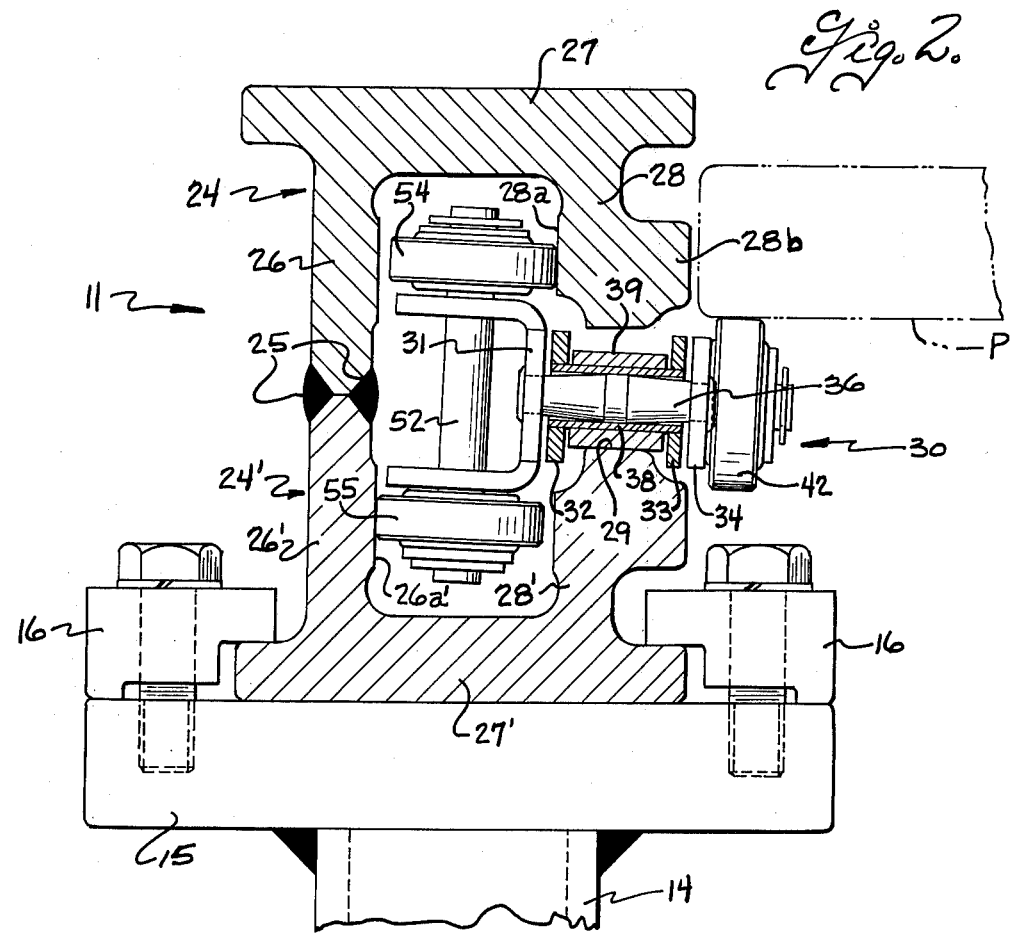
FIG. 2 is a full size cross-sectional view taken generally along line 2—2 of FIG. 1.

A conveyor chain, generally designated 30 is disposed in the access opening and in contact with the bearing surface 29. As best seen in FIG. 2, the conveyor chain includes a plurality of sidebars 31-34 which are interconnected by means of barrel-shaped pins 36 passing through bushings 38. The bushings carry rollers 39 which ride on the bearing surface 29. The front wall 28 has an outwardly extending lip 28b which overlies the sidebars 31-34 and shields the roller 39 from foreign matter.

Every other pin 36 is extended toward the opposite trackway and carries a roller wheel 42, and those wheels 42 support the pallets P. It should be understood that the pallets P can then be stopped, for example at a work station, without stopping the movement of the conveyor chain. Upon release of the pallet P, friction gradually accelerates the pallet until it is driven at the speed of the conveyor chain.

Every other sidebar or link 31 is formed into a rearwardly extending yoke disposed in the internal passageway. The yoke carries a generally upright axle 52 which has wheels 54 and 55 mounted at the upper and lower ends thereof, respectively. These wheels resist the overturning force provided by the weight of the pallet P on roller wheel 42. Upper wheel 54 bears against upright face 28a; while lower wheel 55 bears against upright face 26d'. The diameter of the wheels 54 and 55 are selected so that they freely roll against the respective face without touching other parts of the internal passageway.

At the drive station S each trackway has its wall 27' cut away, as seen in FIG. 3, to accommodate two sprockets 61, 62 disposed with their teeth at a level to engage the conveyor chain 30. Intermediate sprockets 61 and 62 is located a mounting block 72 which carries two roller wheels 74 to support the pallets as they pass the gap between the sprockets. A chain tensioning idler sprocket 63 is disposed at a level below the other two sprockets. The conveyor chain 30 is entrained around the idler sprocket 63 which serves to take up any slack in the chain. Sprocket 61 is mounted on a drive shaft 64 which also carries a corresponding sprocket 61 for the opposite trackway (see FIG. 1). Similarly, sprocket 62 is mounted on a shaft 65 which is also a common shaft. Thus, at the drive station S there are six sprockets, three for each trackway. Motor M drives drive shaft 64 via a drive train which includes a gear reducer (not shown) and sprockets 68 and 69 shown in FIG. 1.

While a preferred embodiment of the invention has herein been illustrated and described, this has been done by way of illustration and not limitation, and the invention should not be limited except as required by the scope of the appended claims.

The embodiments of the invention in which an exclusive property or privilege is claimed are defined as follows:

1. A power driven conveyor having spaced, parallel trackways extending in a closed loop so that the conveyor is an endless conveyor, and comprising, in combination:

each trackway having identical elongate, upper and lower extruded members welded together to provide a generally C-shaped cross-section, each trackway having wall means defining an internal passageway and arranged to provide a laterally opening access to the passageway, said access opening facing the other trackway and extending the full length of the trackway;

the upper member having a generally upright face on the wall means directly above the access opening and defining part of the internal passageway;

the lower member having a generally upright face on the wall means opposite the access opening and at a level there-below, and defining part of the internal passageway; the lower member also having an upwardly facing bearing surface at the bottom of the access opening;

a conveyor chain disposed in each access opening and in contact with the bearing surface; each chain having a plurality of wheels mounted thereon and disposed in the internal passageway; about one-half of said wheels arranged to contact and ride against the upright face directly above the access opening, and the remainder arranged to contact and ride against the upright face opposite the access opening; and means engaged with the conveyor chains for driving them along their respective trackway.

2. A power driven conveyor as set forth in claim 1 wherein the conveyor chains have sidebars on opposite sides of the access opening with rollers disposed between the sidebars; and the upper member has a longitudinally extending lip which overlies at least part of the sidebars and serves as a shield for the rollers.

3. A power driven conveyor as set forth in claim 1 including a frame for supporting the trackways; each lower member having outwardly extending flanges at opposite sides of the bottom thereof; and means engaged with the flanges for mounting the trackways on the frame.

4. A power driven conveyor as set forth in claim 1 wherein the conveyor chains carry roller wheels outside the access opening and closely adjacent the trackway; and including a plurality of pallets extending between the trackways and supported on the roller wheel.

5. A power driven conveyor as set forth in claim 4 wherein the closed loop of the conveyor is in a horizontal plane, thereby providing inner and outer trackways; the conveyor having end portions in which the inner and outer trackways are concentric and have a common arc center; and the pallets have an arcuate outer edge disposed at about the same radius as the inner edge of the outer trackway.

6. A power driven conveyor as set forth in claim 5 wherein the concentric trackways are stretch-bent into their semicircular shape; and a support structure extending between the trackways and passing through said common arc center to hold the concentric trackways in said semicircular position.

7. A power driven conveyor as set forth in claim 1 wherein the last-mentioned means includes six sprockets and a motor for driving the sprockets; each trackway having its wall means cut away at the bottom side thereof to accommodate two sprockets disposed with their teeth at a level to engage the conveyor chain; one of said two sprockets being on a common shaft with a corresponding sprocket in the other trackway, and operatively connected to the motor, whereby the conveyor chains are driven; and a third of said sprockets being positioned at a level below the other two and operating to tension the conveyor chain.

8. A power driven conveyor as set forth in claim 7 wherein the conveyor chains carry roller wheels outside the access opening and closely adjacent the trackway; and including a plurality of pallets extending between the trackways and supported on the roller wheels; and at least one roller wheel mounted between said two sprockets at the level of the roller wheels on the conveyor chain to support the pallets as they pass thereby.

9. A power driven conveyor as set forth in claim 8 in which the conveyor chains have sidebars on opposite sides of the access opening with rollers disposed between the sidebars; each upper member has a longitudinally extending lip which overlies at least part of the sidebars and serves as a shield for the rollers, each lower member has outwardly extending flanges at opposite sides of the bottom thereof; a frame for supporting the trackways; and means engaged with the flanges for mounting the trackways on the frame.

10. A power driven conveyor as set forth in claim 9 wherein the closed loop of the conveyor is in a horizontal plane, thereby providing inner and outer trackways;

the conveyor having end portions in which the inner and outer trackways are concentric and have a common arc center; the concentric trackways being stretch-bent into their semicircular shapes; the frame including a support structure extending between the trackways and passing through said common arc center to hold the concentric trackways in said semicircular position; and the pallets having an arcuate outer edge disposed at about the same radius as the inner edge of the outer trackway.

* * * * *